Figure 1:
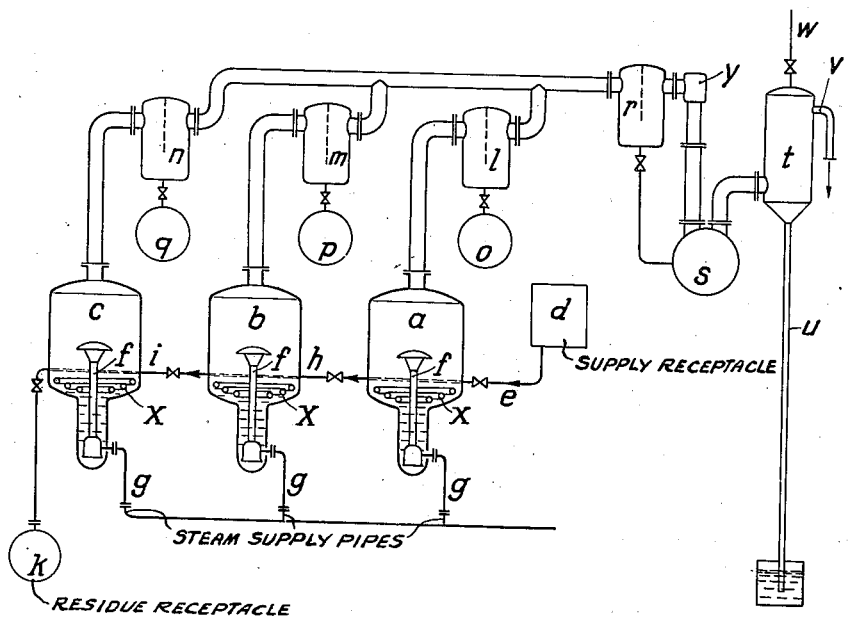

Dec. 26, 1939.    O. BRÜCKE    2,184,579
DISTILLATION OF MIXTURES OF HIGH BOILING POINT LIQUIDS
Filed June 2, 1937    2 Sheets-Sheet 1

Inventor:
Otto Brücke,
Bailey & Carson
Attorneys

Dec. 26, 1939.　　　　O. BRÜCKE　　　　2,184,579
DISTILLATION OF MIXTURES OF HIGH BOILING POINT LIQUIDS
Filed June 2, 1937　　　2 Sheets-Sheet 2

Inventor:
Otto Brücke,
Bailey & Carson
Attorneys

Patented Dec. 26, 1939

2,184,579

UNITED STATES PATENT OFFICE 2,184,579

DISTILLATION OF MIXTURES OF HIGH BOILING POINT LIQUIDS

Otto Brücke, Hochspeyer, Pfalz, Germany, assignor to American Lurgi Corporation, New York, N. Y., a corporation of New York Application June 2, 1937, Serial No. 146,068
In Germany June 24, 1936

9 Claims. (Cl. 202—46)

This invention relates to a method for the distillation of mixtures of high boiling point liquids.

Application Serial No. 100,117 filed September 10, 1936, by Karl Sondermann relates to a method for the continuous distillation of high boiling point liquids, consisting of carrying out the distillation, in the first stage of a two-stage vaporization, with constant circulation and forcing up above the surface of the liquid, and of constantly diverting a portion of the circulated liquid to the second vaporization stage.

The present invention is a further development of this method of distillation applied to the continuous distillation of mixtures of substances having different boiling points. Such mixtures are, for example, the fatty acids contained in vegetable and animal oils and fats, some fractions of which are listed below with the corresponding boiling points:

| Substance | Empirical formula | Boiling point |
|---|---|---|
| | | °C. |
| Capric acid | $C_{10}H_{20}O_2$ | 139 |
| Lauric acid | $C_{12}H_{24}O_2$ | 158 |
| Myristic acid | $C_{14}H_{28}O_2$ | 176 |
| Palmitic acid | $C_{16}H_{32}O_2$ | 194 |
| Stearic acid | $C_{18}H_{36}O_2$ | 209 |
| Arachic acid | $C_{20}H_{40}O_2$ | 223.5 |

The boiling points are given for an absolute pressure of 5 mm. mercury. Mineral oils obtained naturally or produced from coal or the like are also mixtures of various constituents which have different boiling points.

The invention aims at isolating the various constituents of such substances through the distillation process. The method of the invention consists of connecting in series two or more vaporization stages for the distillation of such substances, and of connecting each individual vaporization stage to a special condenser for the purpose of continuously extracting the distillates in two or more fractions by corresponding adjustment of the level of the vaporization temperatures in the different vaporization stages.

In each vaporization stage the liquid to be distilled is at the same time constantly raised into the vapour chamber of the still by means of a circulating device, so that a very brisk movement of the liquid is produced in the still. A portion of the quantity of liquid forced up is diverted into the succeeding vaporization stage. The residue of distillation is removed from the last vaporization stage in the same manner.

By means of the method of the present invention it is possible to carry out the distillation in a very short time and to separate the valuable substances to be distilled off practically completely from the residue of distillation. In addition, good separation of the individual fractions from one another is achieved. The liquid can be passed through the distilling plant in a very short time, and detrimental effects, such as may occur in known methods by heating for too long a time or at too high a temperature, are reliably avoided. In particular, the distillates formed in the first vaporization stage or stages remain only a very short time in the distilling apparatus. During this time they are, moreover, subjected only to the particular temperatures required for their distillation. In consequence of this very sparing treatment, all traces of decomposition hitherto observed are avoided and particularly valuable products of the highest quality are obtained.

In order more clearly to understand the invention, reference is made to the accompanying drawings, which illustrate diagrammatically and by way of example, two embodiments thereof:

Fig. 1 being one embodiment of apparatus; and

Figure 2:
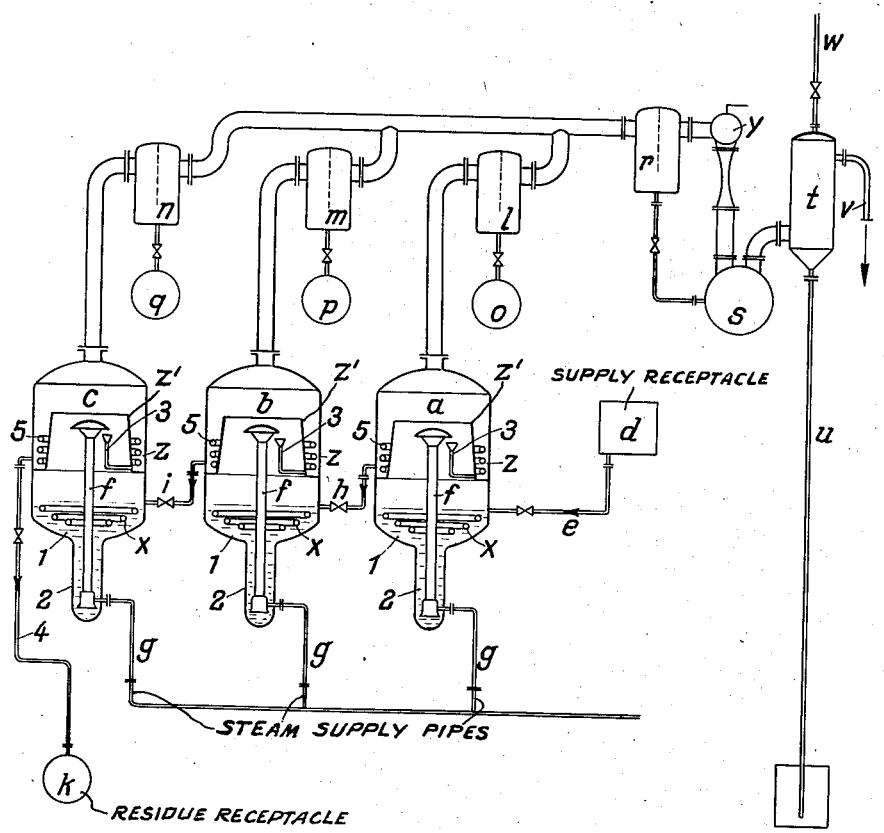

Fig. 2 another embodiment of the apparatus of the invention.

The mixture to be distilled is passed from the receptacle $d$ through the pipes $e$, $h$ and $i$ in succession through the vaporization stages $a$, $b$ and $c$, whilst the distillation residue accumulates in the container $k$. Each stage of vaporization is provided with a device $f$ by means of which the liquid to be distilled is forced up and made to circulate, this being preferably effected by the introduction of steam from below into the device $f$ through the steam supply pipes $g$. The steam in the devices $f$ then pneumatically transports the liquid present in the stills, which also enters the device $f$ from below. Three condensers $l$, $m$ and $n$ are provided, corresponding to the three vaporization stages, said condensers being connected to the corresponding stills by suitable pipes. The distillate vapours flow through these pipes from the stills into the condensers, where they are condensed, the resulting condensates being collected in the receivers $o$, $p$ and $q$. The distillation may be accelerated in known manner by the introduction of steam or other suitable gases into the liquid to be distilled.

In the devices illustrated in Figs. 1 and 2, the same absolute pressure obtains in all vaporization stages, and the fractional distillation is achieved by setting different heating steam temperatures in the heating coils $x$ by suitably adjusting the steam pressures. Further separators or receivers $r$ and $s$ can be provided in case small quantities of distillate were not deposited in the main condensers $m$, $n$ and $l$ and had to be condensed subsequently. The steam introduced for the steam distillation is condensed in the condenser $t$. This condenser is shown in the drawings as a jet condenser, to which the cooling water is conveyed through $w$ and from which the heated cooling water flows off through $u$. The non-condensable gases or vapours are passed through $v$ to an air pump of any desired design. In order to protect the substance to be distilled, it is generally convenient to keep the vaporization temperatures as low as possible. This can be achieved by inserting between the condensers $l$, $m$ and $n$ and the water vapour condenser $t$ a steam jet compressor $y$ which produces in the plant the desired high degree of evacuation.

Whereas in the stills $a$, $b$, and $c$ in accordance with Fig. 1, a portion of the quantity of liquid forced up by the device $f$ is diverted to the succeeding stage or to the receiver $k$ immediately after it has fallen on to the surface of the liquid, the stills of the plant illustrated in Fig. 2 are of two-stage design. Each still has a lower liquid chamber 1 with tubular attachment 2, which is fitted for the purpose of facilitating the arrangement and the operation of the circulating device $f$. The second liquid chamber $z$ is of annular design and is provided with a partition $z'$ which is open at the top and which provides a common wall between chamber 1 and 2. The latter is so disposed that the liquid entering through the pipe 3 on one side of the partition must flow round through the whole of the second liquid chamber. In this way the particular contituents of the liquid desired are distilled off, and the liquid then flows off through the pipe $h$, $i$ or 4 disposed on the other side of the partition. In both liquid chambers it is also possible to fit per se known perforated pipes or the like for the direct introduction of steam or the like into the liquid to be distilled.

From the first liquid chamber the liquid passes into the second by the fact that a portion of the quantity of liquid forced up by the pneumatic conveying device is constantly trapped by means of the device 3, through which it flows into the chamber $z$. The latter is, furthermore, provided in known manner with heating means 5. With the aid of this apparatus a very complete separation of the individual constituents of the liquid treated having different boiling points is possible.

I claim:

1. A method for the continuous distillation of mixtures of a plurality of substances which have different boiling points, in at least two serially arranged vaporization stages, which comprises forcing up the mixture to be distilled from the liquid space into the vapour space of the distilling vessel in every stage, constantly diverting a portion of the forced up liquid without intermingling with the liquid remaining in the liquid space into the next still, separately condensing the distillate vapours obtained in each still, and adjusting the vaporization temperatures in the various vaporization stages to different values for the purpose of continuously extracting the distillates in two or more fractions.

2. A method for the continuous distillation of mixtures of a plurality of substances which have different boiling points, in at least two serially arranged vaporization stages, which comprises forcing up the mixture to be distilled from the liquid space into the vapour space of the distilling vessel in every stage, constantly diverting a portion of the forced up liquid without intermingling with the liquid remaining in the liquid space into the next still, separately condensing the distillate vapours obtained in the various vaporization stages to different values while maintaining an approximately equal degree of evacuation in all the stages for the purpose of continuously extracting the distillates in two or more fractions.

3. A method for the continuous distillation of mixtures of a plurality of substances which have different boiling points, in at least two serially arranged vaporization stages, which comprises forcing up the mixture to be distilled from the liquid space into the vapour space of the still in every stage, constantly diverting a portion of the forced up liquid from the vapour space without intermingling with the liquid remaining in the liquid space into the next still, separately condensing the distillate vapours obtained in each still, and adjusting the vaporization temperatures in the various vaporization stages to different values for the purpose of continuously extracting the distillates in two or more fractions.

4. A method for the continuous steam distillation of mixtures of a plurality of substances which have different boiling points, in at least two serially arranged vaporization stages, which comprises forcing up the mixture to be distilled from the liquid space into the vapour space of the still in every stage, constantly diverting a portion of the forced up liquid from the vapour space without intermingling with the liquid remaining in the liquid space into the next still, separately condensing the distillate vapors obtained in each still, adjusting the vaporization temperatures in the various vaporization stages while maintaining an approximately equal degree of evacuation to different values for the purpose of continuously extracting the distillates in two or more fractions, and compressing and thereupon condensing the steam that is passed through the liquid in each still after condensation of the distillate vapours.

5. A method for the continuous distillation of mixtures of a plurality of substances which have different boiling points, in at least two serially arranged vaporization stages, which comprises constantly forcing up the mixture to be distilled from the liquid space into the vapour space of the still in every stage, passing a portion of the forced up liquid from the vapour space into a second annular liquid chamber disposed in the same still, passing the liquid round through the second liquid chamber and then into the next still, separately condensing the distillate vapours obtained in each still, and adjusting the vaporization temperatures in the various vaporization stages to different values, for the purpose of continuously extracting the distillates in two or more fractions.

6. A method for the continuous steam distillation of mixtures of a plurality of substances which have different boiling points, in at least two serially arranged vaporization stages, which comprises constantly forcing up the mixtures to be distilled from the liquid space into the vapour space of the still in every stage, passing a portion of the forced up liquid from the vapour space into a second annular liquid chamber disposed in the same still, passing the liquid round through the second liquid chamber and then into the next still, separately condensing the distillate vapours obtained in each still, adjusting the vaporization temperatures in the various vaporization stages while maintaining an approximately equal degree of evacuation to different values for the purpose of continuously extracting the distillates in two or more fractions, and compressing and thereupon condensing, after condensation of the distillate vapours, the steam that is passed through the liquid in each still.

7. A method for the continuous distillation of mixtures of a plurality of substances which have different boiling points, in at least two serially arranged vaporization stages, which comprises, in each stage, introducing steam into the liquid space of the distilling vessel, thereby forcing up steam and liquid into the vapour space thereof, constantly diverting a portion of the forced up liquid from the vapour space without intermingling with the liquid remaining in the liquid space into the next stage, separately condensing the distillate vapours obtained in each still and adjusting the vaporization temperatures in the various vaporization stages to different values for the purpose of continuously extracting the distillates in two or more fractions.

8. A method for the continuous distillation of mixtures of a plurality of substances which have different boiling points, in at least two stages, which comprises, in each stage, forcing up liquid into the vapour space thereof, constantly diverting a portion of the forced up liquid from the vapour space into a second chamber within the same distilling vessel where such diverted liquid is further heated, passing such further heated liquid to the next stage, separately condensing the distillate vapours obtained in each still and adjusting the vaporization temperatures in the various vaporization stages to different values for the purpose of continuously extracting the distillates in two or more fractions.

9. A method for the continuous distillation of mixtures of a plurality of substances which have different boiling points, in at least two serially arranged vaporization stages, which comprises, in each stage, introducing steam into the liquid space of the distilling vessel, thereby forcing up steam and liquid into the vapour space thereof, constantly diverting a portion of the forced up liquid from the vapour space into a second chamber within the same distilling vessel where such diverted liquid is further heated, passing such further heated liquid to the next stage, separately condensing the distillate vapours obtained in each still and adjusting the vaporization temperatures in the various vaporization stages to different values for the purpose of continuously extracting the distillates in two or more fractions.

OTTO BRÜCKE.